E. G. SHOCKEY.
DRAFT APPLIANCE.
APPLICATION FILED JULY 7, 1921.
1,417,112.
Patented May 23, 1922.
2 SHEETS—SHEET 1.
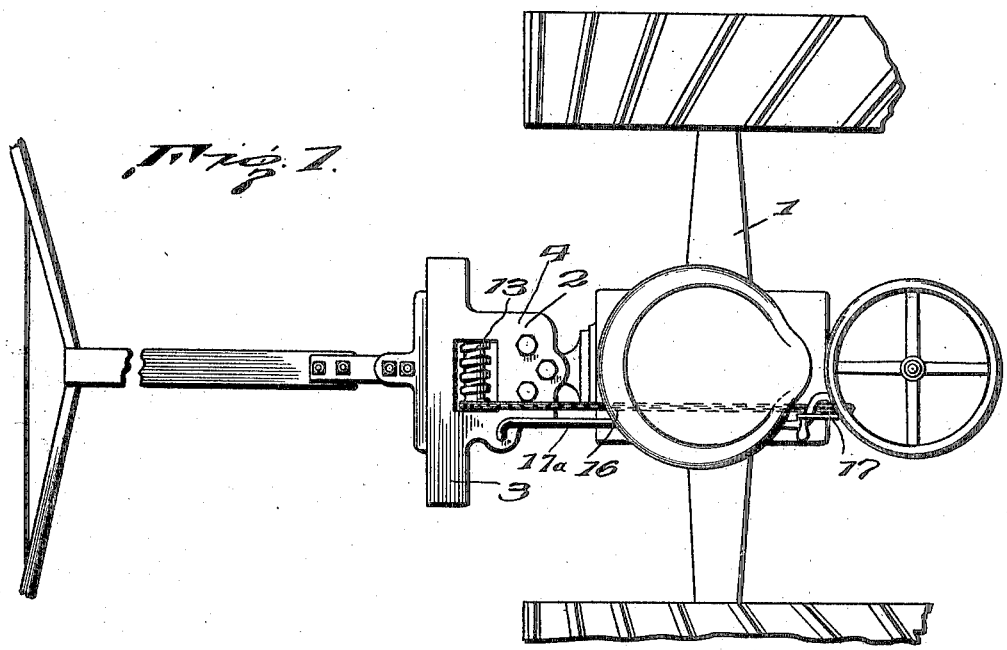
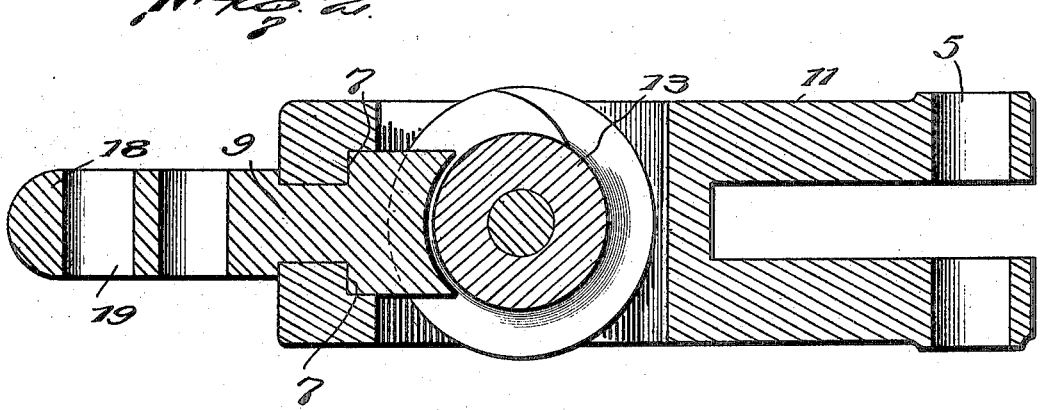
Inventor
Eli G. Shockey
By Eccleston & Eccleston
Attorneys

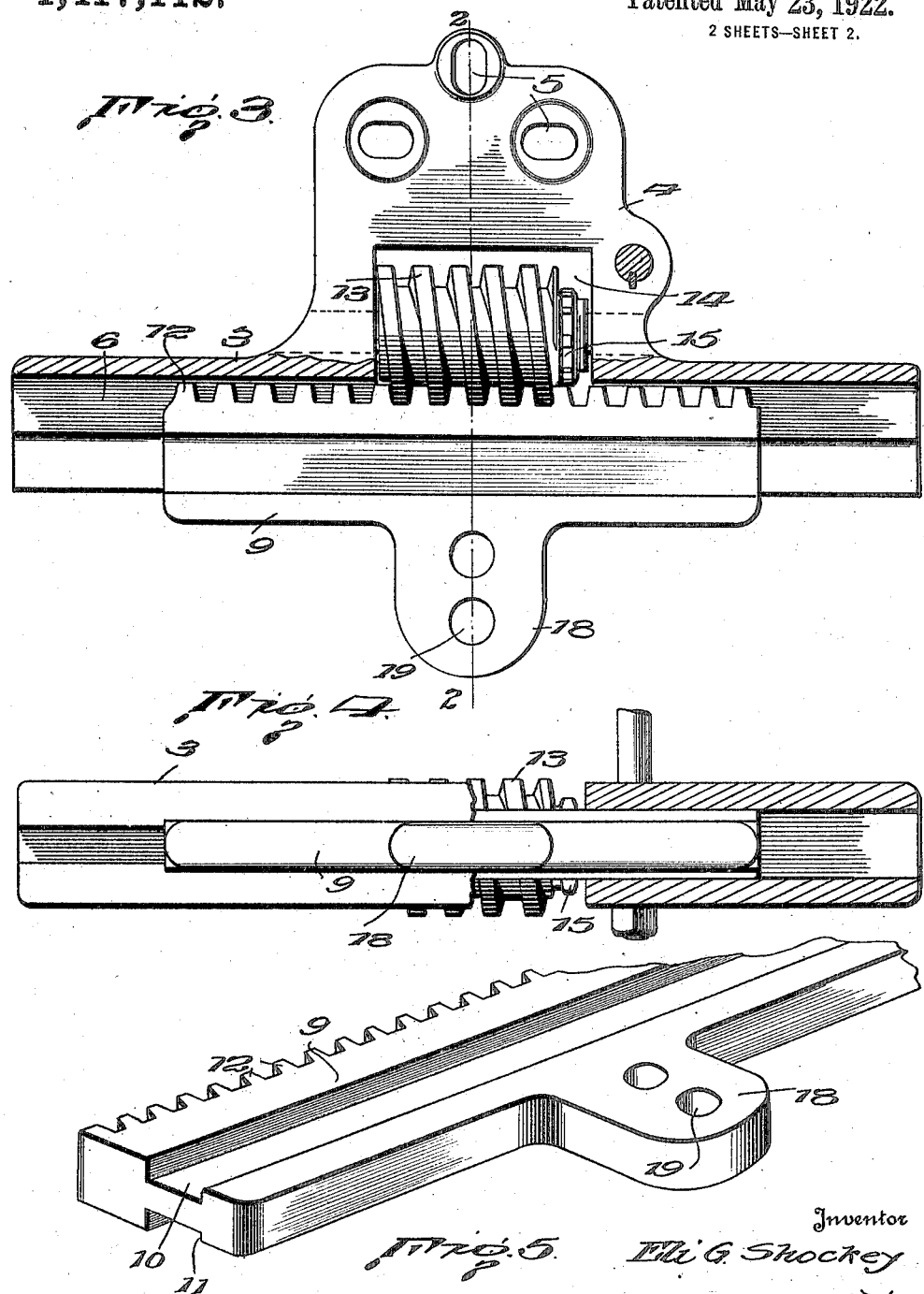

UNITED STATES PATENT OFFICE.

ELI G. SHOCKEY, OF SAND PATCH, PENNSYLVANIA.

DRAFT APPLIANCE.

1,417,112.          Specification of Letters Patent.      Patented May 23, 1922.

Application filed July 7, 1921. Serial No. 482,969.

*To all whom it may concern:*

Be it known that I, ELI G. SHOCKEY, a citizen of the United States, residing at Sand Patch, in the county of Somerset and State of Pennsylvania, have invented certain new and useful Improvements in Draft Appliances, of which the following is a full, clear, and exact description.

This invention relates to a draft appliance or draw-bar to be used in connection with the Fordsons or other tractors, and has for its object to provide such a device which may be moved laterally of the tractor and thereby keep the line of traction always in the center line of the plow or other farm implement being drawn.

Another object of the invention is to provide such a device which is simple in arrangement and made of comparatively few parts, and one in which the force of the pull is applied to substantial parts of the apparatus rather than to the relatively weak operating mechanism.

Other objects and advantages of the device will be apparent from the following description when taken in connection with the accompanying drawings, in which:

Figure 1 is a plan view of a tractor with my device attached.

Figure 2 is a section taken on line 2—2 Fig. 3.

Figure 3 is a plan view of my attachment partly in section.

Figure 4 is a rear view of the device partly in section; and,

Figure 5 is a fragmentary perspective view of the draw-bar.

Referring to the drawings more in detail, the numeral 1 designates a tractor to which my draft appliance, designated generally by the numeral 2, is applied. This appliance consists of a guide bar or member 3 having the laterally projecting neck 4, provided with openings 5, by which the device is attached to the tractor.

The guide bar 3 is provided with a longitudinal passage or channel 6 forming shoulders 7—7 and inwardly directed flanges 8—8. Mounted in this channel for sliding movement therein is the draft bar 9. This bar is channeled as shown at 10, Fig. 5, to provide shoulders 11, which abut the shoulders 7 of the guide member 3. One edge of the bar 9 is provided with teeth 12 to be engaged by the worm 13, which is mounted for rotation in a recess 14 in the neck 4. The worm 13 is formed with a gear wheel 15 with which is operatively connected a chain 16 to be operated from the seat of the tractor by wheel 17 which is supported on bracket 17ª. The edge of the draw bar 9 opposite to the teeth 12 is provided with an extension 18 in which are formed the openings 19 by which it may be connected to a plow or other implement or vehicle to be drawn.

In use, should the tractor be working around a hill and slip an inch or more sideways, the driver merely turns the wheel 17 in the proper direction and thereby shifts the bar 9 the proper amount so that the line of traction will still remain along the center line of the apparatus being drawn. My draft appliance is also useful when drawing vehicles around sharp curves, etc.

In accordance with the patent statutes I have described what I now believe to be the best embodiment of my invention, but I do not wish to be understood thereby as limiting myself or the scope of the invention, as many changes and modifications may be made without departing from the spirit of the invention, and all such I aim to include in the scope of the appended claims.

What I claim as new and desire to secure by Letters Patent is:

1. In a draft appliance, a guide bar having a longitudinal slot therein providing shoulders, and a vertically extending opening with which a portion of the slot communicates, an elongated draft bar located in said slot and engaging said shoulders, teeth formed on one edge of the draft bar, and a worm in said opening for cooperating with said teeth.

2. In a draft appliance, a guide bar made of cast metal and formed with a slot and a vertically extending opening, said slot being so shaped as to provide inwardly directed flanges, and an elongated draft bar located in said slot, said draft bar being formed with countersunk portions to receive said flanges.

3. In a draft appliance, a guide bar made of cast metal, and formed with a slot and a vertically extending opening, said slot being so shaped as to provide inwardly directed flanges, an elongated draft bar provided with countersunk portions engaged by said flanges, teeth on one edge of said draft bar, and a worm in said recess for engaging the teeth.

ELI. G. SHOCKEY.